United States Patent
Von Der Weiden et al.

(10) Patent No.: US 10,207,480 B2
(45) Date of Patent: Feb. 19, 2019

(54) SWITCHABLE ELECTRICAL COMPOSITE PANE ARRAY

(71) Applicant: SAINT-GOBAIN GLASS FRANCE, Courbevoie (FR)

(72) Inventors: Ingo Von Der Weiden, Aachen (DE); Andreas Sznerski, Alsdorf (DE); Franz Penners, Heinsberg (DE); Julius Mennig, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/417,788

(22) PCT Filed: Jun. 28, 2013

(86) PCT No.: PCT/EP2013/063628
§ 371 (c)(1),
(2) Date: Jan. 27, 2015

(87) PCT Pub. No.: WO2014/023475
PCT Pub. Date: Feb. 13, 2014

(65) Prior Publication Data
US 2015/0298431 A1    Oct. 22, 2015

(30) Foreign Application Priority Data

Aug. 9, 2012    (EP) .................................... 12179771

(51) Int. Cl.
*B32B 17/10*    (2006.01)
*B60J 3/04*    (2006.01)
(Continued)

(52) U.S. Cl.
CPC ...... *B32B 17/10036* (2013.01); *B29C 65/002* (2013.01); *B32B 17/10174* (2013.01);
(Continued)

(58) Field of Classification Search
CPC .......... G01N 15/0826; G01N 2015/086; H01L 33/22; H01L 33/32; H01L 33/007;
(Continued)

(56) References Cited

U.S. PATENT DOCUMENTS 4,578,526 A * 3/1986 Nakano ............. B32B 17/10761
136/251
4,799,745 A    1/1989 Meyer et al.
(Continued)

FOREIGN PATENT DOCUMENTS

CN    1526085 A    9/2004
CN    101415550 A    4/2009
(Continued)

OTHER PUBLICATIONS

McMaster-Carr (Super-Touch Surface-Protection Tape Part #3402A14), Accessed Mar. 14, 2016.*
(Continued)

*Primary Examiner* — Frank J Vineis
*Assistant Examiner* — Alicia J Sawdon
(74) *Attorney, Agent, or Firm* — Steinfl + Bruno, LLP

(57) ABSTRACT

A composite switchable pane array, having: a first pane; a second pane, and an intermediate layer arranged therebetween, wherein the intermediate layer has at least one first thermoplastic polymer film and one second thermoplastic polymer film, and an SPD film arranged therebetween; and an edge sealing arranged in the outer edge region of the intermediate layer, containing a polyimide (PI) and/or polyisobutylene (PIB).

7 Claims, 6 Drawing Sheets

Figure 1:
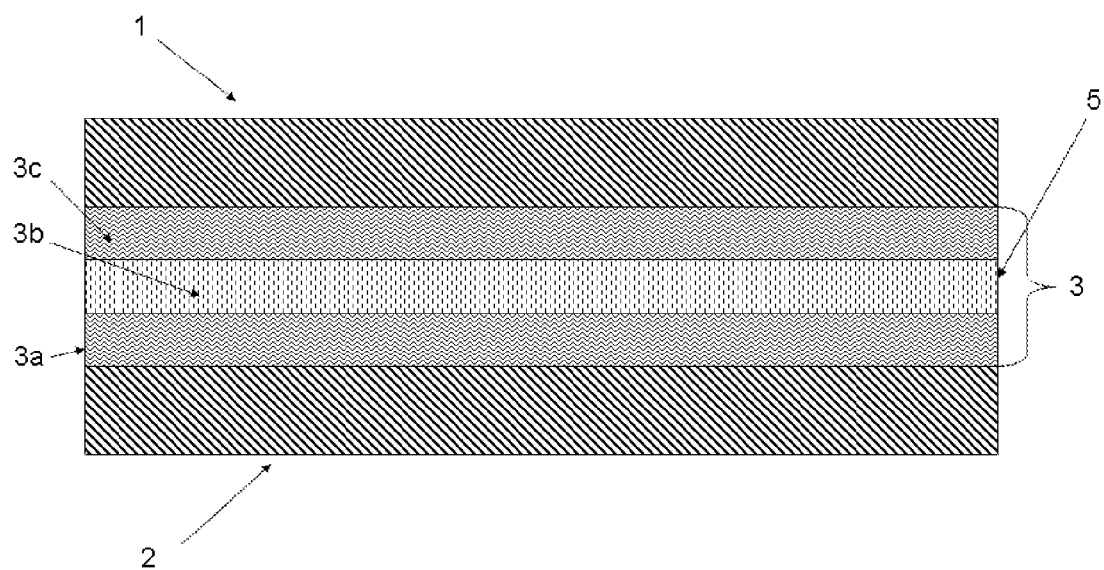

(51) Int. Cl.

| | | |
|---|---|---|
| *E06B 9/24* | (2006.01) | |
| *B29C 65/00* | (2006.01) | |
| *B32B 37/18* | (2006.01) | |
| *B32B 38/00* | (2006.01) | |
| *G02F 1/17* | (2006.01) | |
| *B29K 629/00* | (2006.01) | |
| *B29K 631/00* | (2006.01) | |
| *B29K 709/08* | (2006.01) | |
| *B29L 11/00* | (2006.01) | |

(52) U.S. Cl.
CPC .. *B32B 17/10302* (2013.01); *B32B 17/10532* (2013.01); *B32B 17/10761* (2013.01); *B32B 17/10788* (2013.01); *B32B 37/185* (2013.01); *B32B 38/0004* (2013.01); *B60J 3/04* (2013.01); *E06B 9/24* (2013.01); *B29K 2629/00* (2013.01); *B29K 2631/00* (2013.01); *B29K 2709/08* (2013.01); *B29L 2011/00* (2013.01); *B32B 2250/03* (2013.01); *B32B 2307/40* (2013.01); *B32B 2315/08* (2013.01); *B32B 2329/06* (2013.01); *B32B 2331/04* (2013.01); *B32B 2419/00* (2013.01); *B32B 2605/006* (2013.01); *E06B 2009/2464* (2013.01); *G02F 1/172* (2013.01); *G02F 2201/083* (2013.01); *G02F 2202/025* (2013.01)

(58) Field of Classification Search
CPC ......... H01L 33/06; H01L 33/10; H01L 33/14; H01L 33/16; H01L 33/20; H01L 27/153; B29C 65/002; B32B 17/10302; B32B 17/10293; B32B 17/10532; B32B 38/0004; B32B 3/02; B32B 3/04; B32B 3/26

See application file for complete search history.

(56) References Cited

U.S. PATENT DOCUMENTS

| | | | |
|---|---|---|---|
| 5,408,353 A | 4/1995 | Nichols et al. | |
| 6,034,813 A | 3/2000 | Woodard et al. | |
| 6,055,088 A | 4/2000 | Fix | |
| 6,056,861 A | 5/2000 | Fuhr | |
| 6,277,523 B1 | 8/2001 | Giron | |
| 6,582,809 B2 | 6/2003 | Boire et al. | |
| 7,486,342 B2 | 2/2009 | Mathey et al. | |
| 9,557,595 B2 | 1/2017 | Brecht et al. | |
| 2002/0064662 A1 | 5/2002 | Lingle et al. | |
| 2003/0160260 A1* | 8/2003 | Hirai | H01L 51/5012 257/103 |
| 2004/0067343 A1* | 4/2004 | Beteille | B32B 17/10036 428/192 |
| 2004/0227462 A1 | 11/2004 | Utsumi | |
| 2004/0257649 A1 | 12/2004 | Heikkila | |
| 2005/0227061 A1 | 10/2005 | Slovak | |
| 2006/0061255 A1 | 3/2006 | Mizuta et al. | |
| 2009/0115922 A1 | 5/2009 | Veerasamy | |
| 2009/0176101 A1 | 7/2009 | Greenall et al. | |
| 2009/0181203 A1 | 7/2009 | Valentin et al. | |
| 2009/0219468 A1* | 9/2009 | Barton | B32B 17/10 349/104 |
| 2009/0323162 A1* | 12/2009 | Fanton | G02F 1/1533 359/275 |
| 2011/0018563 A1* | 1/2011 | Reese | G01N 15/0826 324/693 |
| 2011/0170170 A1 | 7/2011 | Boote | |
| 2011/0171443 A1* | 7/2011 | Thompson | B32B 17/10036 428/212 |
| 2012/0013969 A1* | 1/2012 | Wang | B32B 17/10036 359/296 |
| 2012/0026573 A1 | 2/2012 | Collins | |
| 2012/0176656 A1* | 7/2012 | Boote | B32B 17/10 359/240 |
| 2012/0307337 A1* | 12/2012 | Bartug | B32B 17/10036 359/245 |
| 2013/0229612 A1* | 9/2013 | Gayout | E06B 9/24 349/193 |
| 2015/0331296 A1 | 11/2015 | Mennig et al. | |

FOREIGN PATENT DOCUMENTS

| | | | |
|---|---|---|---|
| CN | 102350833 A | 2/2012 | |
| DE | 102008026339 | 12/2009 | |
| EP | 0876608 | 11/1998 | |
| EP | 1862849 | 12/2007 | |
| EP | 2010385 | 1/2009 | |
| EP | 2013013 | 1/2009 | |
| JP | H04-504555 A | 8/1992 | |
| JP | H05-165011 A | 6/1993 | |
| JP | H10-217378 A | 8/1998 | |
| JP | 2901676 B2 | 6/1999 | |
| JP | 2008025229 | 2/2008 | |
| JP | 2008-249770 A | 10/2008 | |
| JP | 2009-533248 A | 9/2009 | |
| JP | 2009-534283 A | 9/2009 | |
| JP | 2010-536707 A | 12/2010 | |
| KR | 10-2005-0121706 A | 12/2005 | |
| WO | 2009061329 | 5/2005 | |
| WO | 2007122426 | 11/2007 | |
| WO | 2009/153593 | 12/2009 | |
| WO | 2010032068 | 3/2010 | |
| WO | 2010112789 | 10/2010 | |
| WO | 2010147494 | 12/2010 | |
| WO | 2011033313 | 3/2011 | |
| WO | WO 2011033313 A1 * | 3/2011 | ............. B32B 17/10 |
| WO | 2012007334 | 1/2012 | |
| WO | WO 2012028823 A1 * | 3/2012 | ............... E06B 9/24 |
| WO | 2012154663 | 11/2012 | |
| WO | WO 2012154663 A1 * | 11/2012 | ....... B32B 17/10036 |

OTHER PUBLICATIONS

3M Riveters Tape 695 (http://multimedia.3m.com/mws/media/666850/riveters-tape-695.pdf) accessed Aug. 29, 2017.*
Written Opinion, dated Aug. 26, 2013 (PCT/ISA/210), for PCT application PCT/EP2013/063628, filed on Jun. 28, 2013, in the name of Saint-Gobain Glass France (English translation and German original).
International Search Report, dated Sep. 27, 2013, for PCT application PCT/EP2013/063629, filed on Jun. 28, 2013, in the name of Saint-Gobain Glass France (English translation and German original).
Written Opinion, dated Sep. 27, 2013 (PCT/ISA/210), for PCT application PCT/EP2013/063629, filed on Jun. 28, 2013, in the name of Saint-Gobain Glass France (English translation and German original).
PCT International Search Report dated Aug. 26, 2013 for PCT/EP2013/063628 filed on Jun. 28, 2013 in the name of Saint-Gobain Glass France.
Kempe M et al: "Evaluation and modeling of edge-seal materials for photovoltaic applications", 35th IEEE Photovoltaic Specialists Conference (PVSC), Jun. 20-25, 2010.
Non-Final Office Action for U.S. Appl. No. 14/418,898, filed Jan. 30, 2015 on behalf of Saint-Gobain Glass France. dated Oct. 6, 2016. 13 pages.
Final Office Action for U.S. Appl. No. 14/418,898, filed Jan. 30, 2015 on behalf of Saint-Gobain Glass France. dated May 17, 2017. 14 pages.
Notice of Allowance for U.S. Appl. No. 14/418,898, filed Jan. 30, 2015 on behalf of Julius Mennig. dated Nov. 15, 2017. 9 pages.
Supplemental Notice of Allowability issued for U.S. Appl. No. 14/418,898, filed Jan. 30, 2015 in the name of Saint-Gobain Glass France. dated Dec. 5, 2017. 6 pages.
Notice of Allowance issued for U.S. Appl. No. 14/418,898, filed Jan. 30, 2015 on behalf of Saint-Gobain Glass France. dated Apr. 2, 2018. 9 pages.

* cited by examiner

SWITCHABLE ELECTRICAL COMPOSITE PANE ARRAY

CROSS REFERENCE TO RELATED APPLICATIONS

The present application is the US national stage of International Patent Application PCT/EP2013/063628 filed internationally on Jun. 28, 2013 which, in turn, claims priority to European Patent Application No. 12179771.6 filed on Aug. 9, 2012.

The invention relates to an electrically switchable composite pane arrangement, methods for production thereof, and its use as motor vehicle and architectural glazing.

Glazings that alter their light transmittance at the push of a button and can thus change between a dark and transparent appearance are widespread in the art. In particular, many possibilities present themselves in the motor vehicle industry. At the height of summer and with strong sunlight, the passenger compartment can be very greatly heated through the window openings. In addition, the driver can be blinded by scattered light while driving. In particular, with roof glazings of motor vehicles, the motor vehicle can be heated up rapidly and strongly in the summer. This heating of the motor vehicle interior has a negative impact not only on the driver's ability to concentrate and to react but also increases the energy and fuel consumption of the motor vehicle to a not insubstantial extent.

Various possibilities exist for regulation of the light transmittance of a pane, for example, in electrochromic glazings or liquid crystal displays (LCDs).

U.S. Pat. No. 6,277,523 B1 describes the construction and operation of an electrochromic coating. The transparency to light of different wavelengths can be controlled and regulated by the application of an electrical load.

JP 2008-025229 A1 discloses a system for altering the light transmittance in double façades. This enables regulation of the amount of incident light and, consequently, the amount of heat in the building. The transmittance control is controlled by nucleation processes, i.e., formation of droplets of a gas in the intermediate layer.

US 2004257649 A1 discloses a multipart architectural glazing with an electrically switchable SPD film.

US 2005/0227061 A1 discloses a method for producing and laminating an SPD film (suspended particle device). The actual SPD film is laminated between adhesive films under the action of heat and vacuum.

EP 2 010 385 B1 discloses a composite glazing with a multilayer intermediate layer. The intermediate layer contains at least three adhesive films, a layer with an infrared reflective function, and an electrical device. This includes a device with a liquid crystal layer or an SPD film. The electrical device is arranged inside a cut-out in an adhesive film.

EP 2 013 013 B1 discloses a composite glazing with an at least three-ply intermediate layer. A middle intermediate layer forms the framework for an SPD film and is laminated together with a bottom intermediate layer and top intermediate layer. As a significant condition, the intermediate layer materials contain no plasticizer.

A frequent problem with laminated glazings is the premature aging of the intermediate films. Especially in conjunction with the UV-radiation of sunlight, penetrating moisture and oxygen can result in an at least superficial degradation of the adhesive film. Consequently, the quality of the edge sealing has a great influence on the quality and long-term stability of the entire glazing. If there are, additionally, inorganic functional layers, in particular metallic functional layers, the aging of the intermediate layers increases significantly more.

Aging can not only affect the overall visual appearance of the glazing, but can also significantly reduce the functionality. In particular, in the region of the outer edges of the glazing, the functionality of the glazing can be significantly reduced. In the area of glazings with SPD films, this means that the color change is delayed in the edge region or can even be completely absent. In particular, when voltage is not applied, the glazing appears increasingly brighter in the edge region. This brightening effect can, over time, spread over the entire area of the glazing.

The object of the invention consists in providing an electrically switchable glazing with SPD film that has high and long-lasting aging stability of the functional layer.

The object of the present invention is accomplished according to independent claim 1. Preferred embodiments emerge from the subclaims.

Two methods according to the invention for producing an electrically switchable glazing with SPD film and its use emerge from further independent claims.

The switchable composite pane arrangement according to the invention comprises at least one first pane, a second pane, and an intermediate layer arranged therebetween. The pane preferably contains flat glass, float glass, quartz glass, borosilicate glass, soda lime glass, and/or mixtures thereof. Alternatively, the pane can also include polymers such as polycarbonate or polymethyl methacrylate (PLEXIGLAS® [acrylic glass ]). The intermediate layer contains at least one first thermoplastic polymer film and one second thermoplastic polymer film as well as an electrically switchable transmittance-variable SPD film arranged therebetween. SPD (suspended particle device) films and foils contain colloidal particles in the preferred size range of less than 1µm. The particles are suspended in a solution or, preferably, in a polymer matrix. In the absence of an electrical field, the colloidal particles are arranged and oriented randomly in the medium. In this state, incident light is absorbed or reflected; the SPD film appears dark and opaque. Upon application of an electrical field, the colloidal particles become aligned. An incident light beam can pass and the SPD film appears transparent. Through variation of the voltage, even a gradual change in the light transmittance of the SPD film is possible. A detailed description SPD films is found, for example, in US 2005/0227061 A1, in particular in [0004] to [0015], a method for the lamination of a pane with SPD film in [0016]. The thermoplastic polymer film preferably contains PVB (polyvinyl butyral) or EVA (polyethyl vinyl acetate). Optionally, polybutylene terephthalate (PBT), polycarbonate (PC), polyethylene terephthalate (PET), and polyethylene naphthalate (PEN), polyvinyl chloride (PVC), polyvinyl fluoride (PVF), polyvinyl butyral (PVB) without plasticizers, and/or copolymers thereof, particularly preferably polyethylene terephthalate (PET) can also be contained. An edge sealing is arranged in the outer edge region, preferably the entire outer edge region of the electrically switchable transmittance-variable SPD film. The edge sealing, preferably as an insulation film, contains a polyimide (PI) and/or polyisobutylene (PIB).

In the context of the invention, the term SPD film means a multilayer film in which the actual active SPD film is arranged congruently between at least one first and at least one second carrier film. The advantage of SPD films resides in simple production of the switchable composite pane arrangement. The SPD film can be prepared in relatively large quantities before production of the pane arrangement and, during production, can be simply inserted into the composite, which is then laminated by conventional methods to form the composite pane.

The carrier films preferably contain at least one thermoplastic polymer, particularly preferably polyethylene terephthalate (PET). The thickness of each carrier film is preferably from 0.1 mm to 1 mm, particularly preferably from 0.1 mm to 0.2 mm.

The edge sealing preferably extends from the outer edge region of the electrically switchable transmittance-variable SPD film at least 1 mm in the direction of the interior surface of the SPD film. The edge sealing preferably comprises a polyimide foil or film. In the context of the invention, the term "outer edge region" means the cut edges of the horizontal flat film. Covering using the edge sealing reduces the aging of the intermediate layer significantly and measurably. The polyimide-containing composition of the edge sealing surprisingly demonstrates better aging protection than, for example, a commercially available adhesive tape (TESA-FILM® [cellophane tape ]).

In an alternative embodiment, the edge sealing is implemented as an at least 1-mm-deep notch in the region of the intermediate layer. The notch extends at least to the SPD film and is filled polyisobutylene (PIB) and/or polyurethane (PU). This edge sealing effectively protects the SPD film against aging and extends the service life of the switchable pane arrangement.

The thermoplastic polymer films preferably contain PVB (polyvinyl butyral) and/or EVA (polyethyl vinyl acetate). A polymer film made of EVA surprisingly presents, in conjunction with the edge sealing according to the invention, which contains polyimides (PI) and/or polyisobutylenes, the highest protection against aging. This is likely attributable to a very strong bonding of the edge sealing according to the invention and the EVA (polyethyl vinyl acetate) during the lamination of the glazing.

The switchable composite pane arrangement preferably includes a third thermoplastic polymer film between the first pane and the second thermoplastic polymer film. This third thermoplastic polymer film can contribute to the improvement of the mechanical properties, for example, breakage resistance. Alternatively, the third thermoplastic film can also serve as a carrier for other functions, for example, protection against the sun.

The switchable composite pane arrangement preferably includes an IR (infrared)-radiation reflective coating between the third thermoplastic polymer film and the second thermoplastic polymer film.

The IR-radiation-reflective coating preferably contains niobium, tantalum, molybdenum, zirconium, silver, gold, aluminum, nickel, chromium, copper, and/or mixtures or alloys thereof.

The electrically switchable transmittance-variable SPD film preferably has an edge set back (cut-out) by 1 mm to 4 mm more than the first thermoplastic polymer film and the second thermoplastic polymer film. This has the effect that the first thermoplastic film and the second thermoplastic film surrounding the SPD film extend beyond the outer edge of the SPD film by 1 mm to 4 mm. In conjunction with the edge sealing according to the invention, this protrusion of the thermoplastic films again significantly increases the aging resistance of the SPD films and of the entire switchable composite pane arrangement.

The edge sealing preferably includes a sheath made of polyurethane, which further increases the aging resistance.

The electrically switchable transmittance-variable SPD film preferably has a thickness from 100 μm to 500 μm, preferably 150 μm to 400 μm.

The electrically switchable transmittance-variable SPD film preferably includes an electrical contact. The electrical contact is connected to a voltage source and a control element which thus enables a change, preferably even a gradual change, of the transmittance of switchable composite pane arrangement.

The edge sealing preferably has a polyacrylic adhesive. In a preferred embodiment, the edge sealing is implemented as an insulating film; the polyacrylic adhesive fixes the insulating film on the electrically switchable SPD film.

The invention further includes a method for producing a switchable composite pane arrangement. In a first step, an electrically switchable transmittance-variable SPD film is sheathed in its outer edge region with an edge sealing (4) containing a polyimide (PI). The edge sealing is preferably implemented as an insulating film including a polyimide film with a polyacrylic adhesive. The sheathed electrically switchable transmittance-variable SPD film forms a film.

In the next step, the film is arranged between a first thermoplastic polymer film and a second thermoplastic polymer film to form an intermediate layer. The first thermoplastic polymer film and the second thermoplastic polymer film are arranged such that the thermoplastic polymer films have an outer edge protrusion at least 2 mm greater than the electrically switchable transmittance-variable SPD film. Preferably, the electrically switchable transmittance-variable SPD film is also provided with an electrical contact.

In the next step, the intermediate layer is laminated between a first pane and a second pane. In further steps, the resultant composite glazing can also be provided with an electrical control device.

The invention further includes an alternative method for producing a switchable composite pane arrangement. An electrically switchable transmittance-variable SPD film is arranged to form an intermediate layer between a first thermoplastic polymer film and a second thermoplastic polymer film.

The intermediate layer is subsequently laminated between a first pane and a second pane.

In a next step, a 1-mm-to-5-mm-deep notch is milled in the region of the electrically switchable transmittance-variable SPD film. In the following steps, the notch is filled with polyisobutylene (PIB) and then with polyurethane (PU).

The invention further includes the use of the switchable composite pane arrangement according to the invention as a motor vehicle glazing, ship glazing, train glazing, aircraft glazing, and/or architectural glazing.

The invention is explained in detail in the following with reference to drawings. The drawings are a purely schematic representation and are not true to scale. They in no way restrict the invention.

Figure 2:
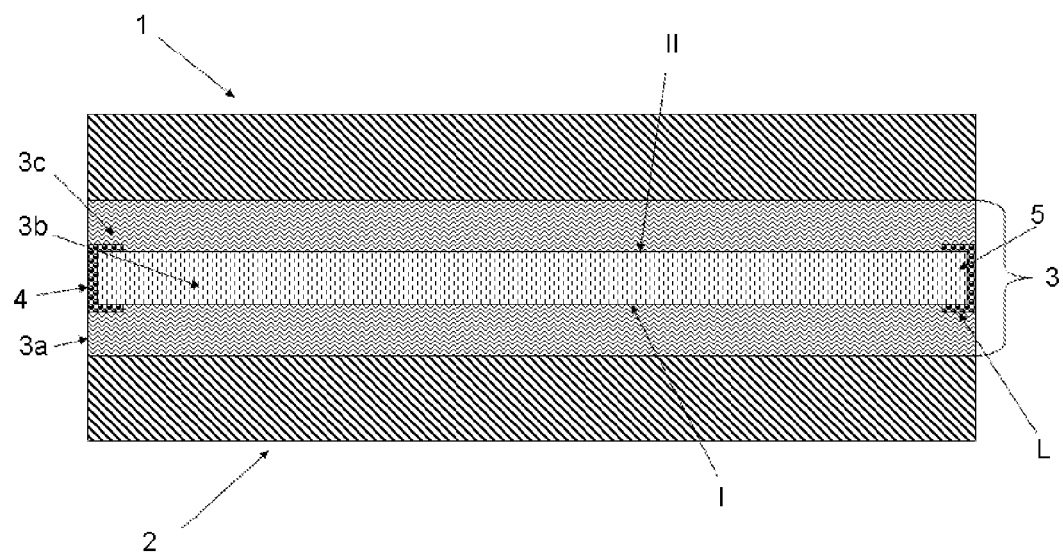
Figure 3:
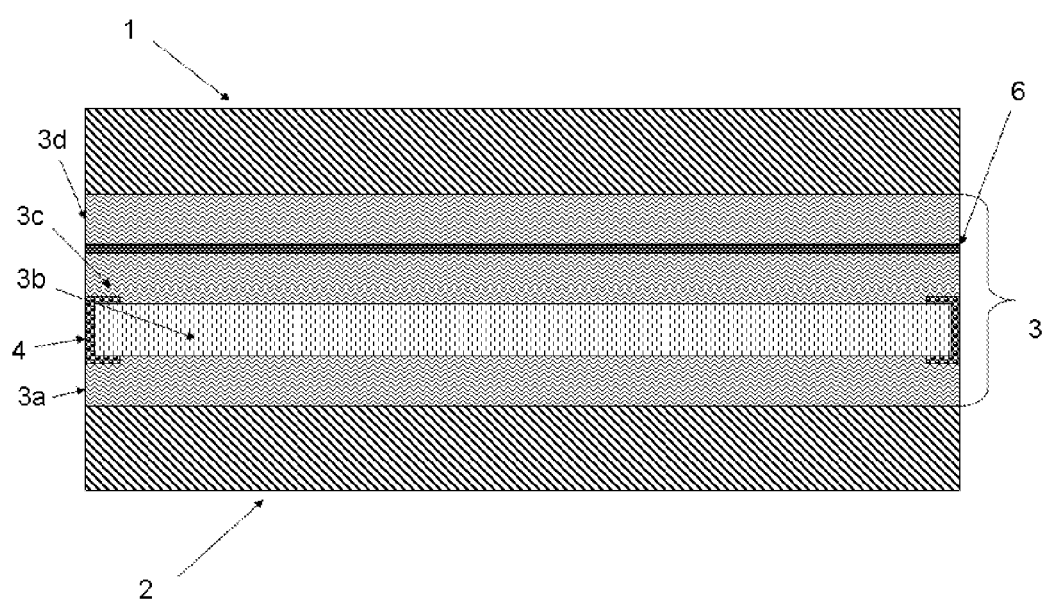
Figure 4:
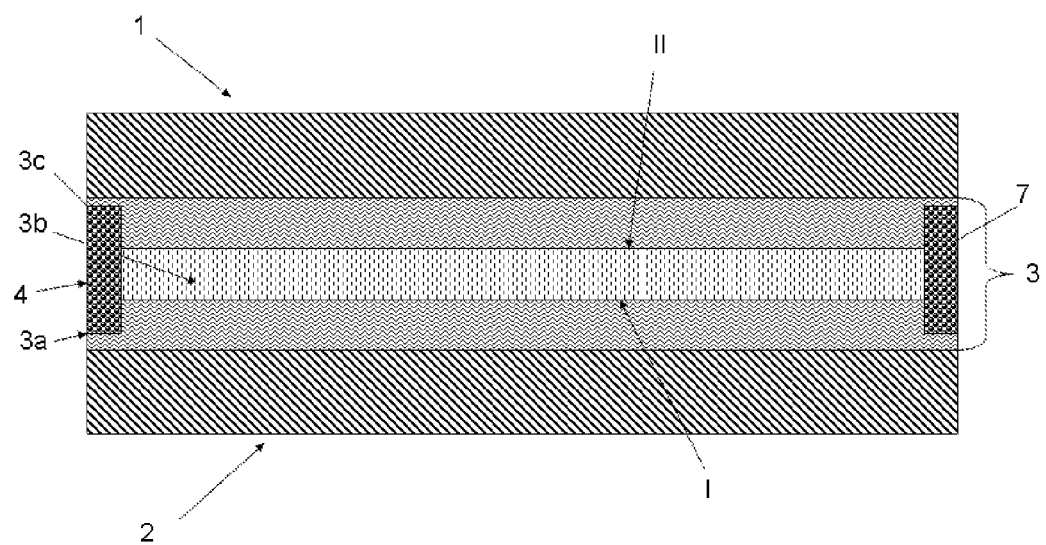
Figure 5:
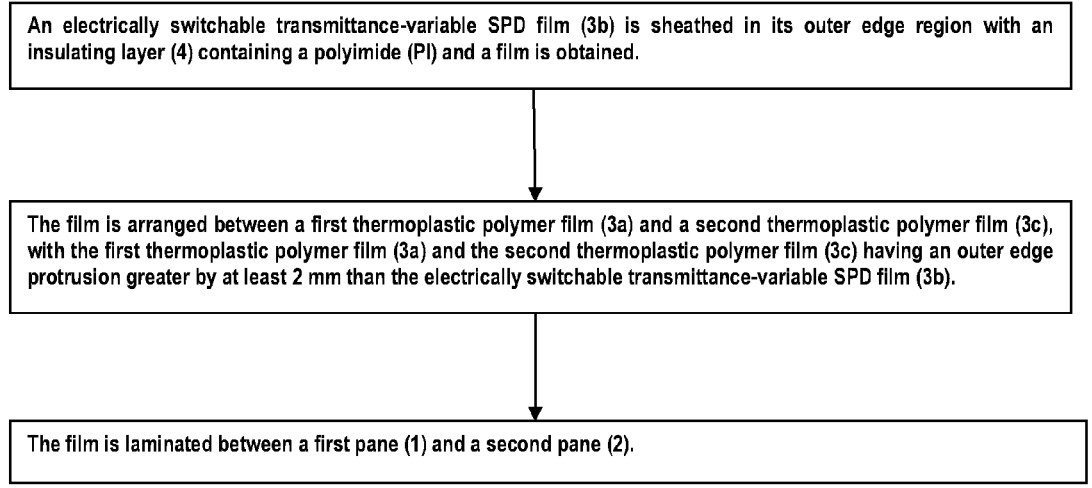
Figure 6:
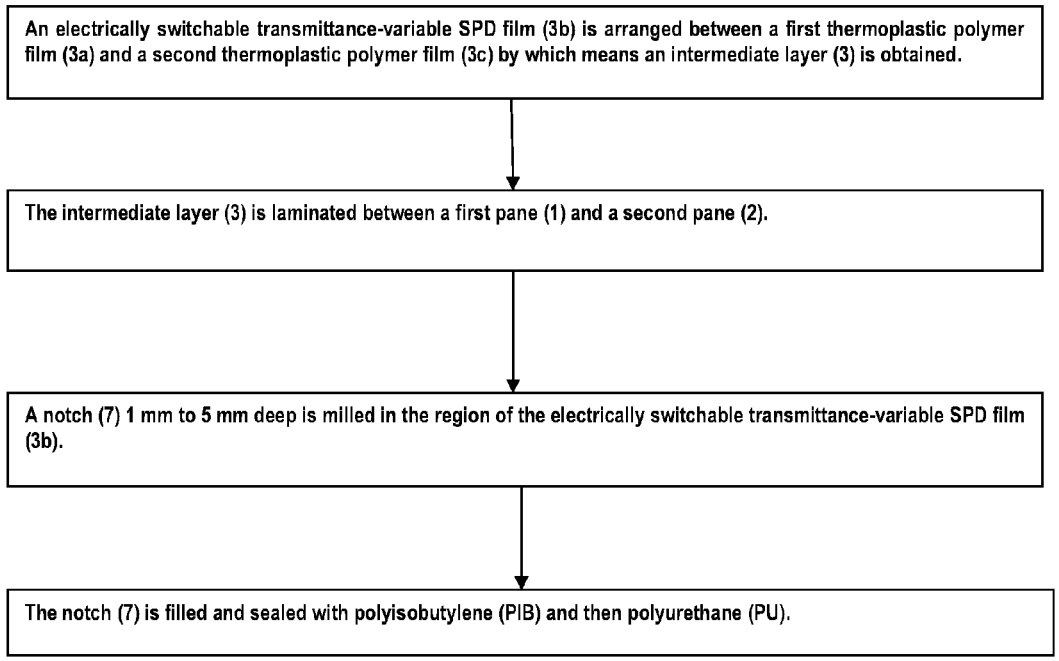

They depict:

FIG. 1 a cross-section of an electrically switchable composite pane arrangement according to the prior art, FIG. 2 a cross-section of an electrically switchable composite pane arrangement according to the invention, FIG. 3 a cross-section of a preferred electrically switchable composite pane arrangement according to the invention, FIG. 4 a cross-section of another preferred electrically switchable composite pane arrangement according to the invention, FIG. 5 a flowchart for producing the electrically switchable composite pane arrangement according to the invention, and FIG. 6 a flowchart for alternative producing of the electrically switchable composite pane arrangement according to the invention.

FIG. 1 depicts a cross-section of an electrically switchable composite pane arrangement according to the prior art. A thermoplastic intermediate layer (3) is arranged between a first pane (1) and a second pane (2). The thermoplastic intermediate layer (3) comprises one first thermoplastic polymer film (3a) and one second thermoplastic polymer film (3c) as well as an electrically switchable transmittance-variable SPD film (3b) arranged therebetween. A voltage source is connected to the electrically switchable transmittance-variable SPD film (3b) by an electrical contact (not shown).

FIG. 2 depicts a cross-section of an electrically switchable composite pane arrangement according to the invention. A thermoplastic intermediate layer (3) is arranged between a first pane (1) and a second pane (2). The thermoplastic intermediate layer (3) comprises one first thermoplastic polymer film (3a) and one second thermoplastic polymer film (3c) as well as an electrically switchable transmittance-variable SPD film (3b) arranged therebetween. An edge sealing (4) is arranged in the outer edge region (5) of the electrically switchable transmittance-variable SPD film (3b). The edge sealing contains a polyimide (PI) with the edge sealing (4) extending from the outer edge region (5) with the length (L) of at least 1 mm above (I) and below (II) the SPD film (3b) between the first thermoplastic polymer film (3a) and the second thermoplastic polymer film (3c). The edge sealing (4) is preferably implemented as a polyimide film.

FIG. 3 depicts a cross-section of a preferred electrically switchable composite pane arrangement according to the invention. The basic structure corresponds to that depicted in FIG. 2. In addition, a third thermoplastic polymer film (3d) is arranged between the first pane (1) and the intermediate layer (3). Moreover, an IR-radiation-reflective coating (6), for example, silver, is arranged between the third thermoplastic polymer film (3d) and the intermediate layer (3).

FIG. 4 depicts a cross-section of an alternative preferred electrically switchable composite pane arrangement according to the invention. The basic structure corresponds, except for the edge sealing (4), to that depicted in FIG. 2. A notch (7) that is filled with an edge sealing (4) made of polyisobuthylene and polyurethane is situated in the edge region of the intermediate layer (3).

FIG. 5 depicts a flowchart for producing the electrically switchable composite pane arrangement according to the invention. In a first step, an electrically switchable transmittance-variable SPD film (3b) is sheathed in its outer edge region with an edge sealing (4) containing a polyimide (PI). The edge sealing (4) is preferably implemented as an insulating film comprising a polyimide film with a polyacrylic adhesive. The sheathed electrically switchable transmittance-variable SPD film (3b) forms a film. In the next step, the film is arranged between a first thermoplastic polymer film and a second thermoplastic polymer film such that the thermoplastic polymer films (3a, 3c) have an edge protrusion at least 2 mm greater than the film. In final steps (not depicted), the electrically switchable transmittance-variable SPD film (3b) is also provided with an electrical contact and an electrical controller.

FIG. 6 depicts a flowchart for alternative production of the electrically switchable composite pane arrangement according to the invention. An electrically switchable transmittance-variable SPD film (3b) is arranged to form an intermediate layer (3) between a first thermoplastic polymer film (3a) and a second thermoplastic polymer film (3c). The resultant intermediate layer (3) is subsequently laminated between a first pane (1) and a second pane (2). In a next step, a notch (7) is milled at least 1 mm into the intermediate layer (3) in the region of the electrically switchable transmittance-variable SPD film (3b). In the following steps, the notch (7) is filled with polyisobutylene (PIB). After curing of the polyisobutylene, the notch (7) is then sealed with polyurethane (PU).

In the following, the invention is explained in detail with reference to two examples and one comparative example. The examples in no way limit the invention.

1. Example (According to the Invention)

A glass composite pane (20 cm×20 cm) contained the following structure (thickness indicated) made of a first pane (1) (2.1 mm), a first thermoplastic polymer film (3a) (EVA, 0.38 mm), an SPD film (3b)(0.35 mm), a second thermoplastic polymer film (3c) (EVA, 0.38 mm), PET with silver coating (6)(0.05 mm), a third thermoplastic polymer film (3c) (EVA, 0.38 mm), a second pane (2) (2.1 mm). The SPD film (3b) was sheathed in the edge region as depicted in FIGS. 2 and 3 with an edge sealing (4) made of polyimide film. The thermoplastic films (3a, 3c) made of EVA had, compared to the SPD film (3b), a protrusion of roughly 2 mm. The glass composite pane was subjected to heated storage for 28 days at 90° C. and a WOM (Weather-Ometer test) for 1000 hours at 90° C. and irradiation by a xenon lamp (PV3929) with energy of 1250 W/h*m$^2$.

2. Example (According to the Invention)

A glass composite pane (20 cm×20 cm) contain the following structure (thickness indicated) made of a first pane (1)(2.1 mm), a first thermoplastic polymer film (3a) (EVA, 0.38 mm), an SPD film (3b) (0.35 mm), a second thermoplastic polymer film (3c) (EVA, 0.38 mm), PET with silver coating (6) (0.05 mm), a third thermoplastic polymer film (3c) (EVA, 0.38 mm), a second pane (2) (2.1 mm). The SPD film (3b) was sheathed in the edge region as depicted in FIG. 4 with an edge sealing (4) made of polyisobutylene and polyurethane. The glass composite pane was subjected, as in Example 1, to heated storage for 28 days at 90° C. and a WOM (Weather-Ometer test) for 1000 hours at 90° C. and irradiation by a xenon lamp (PV3929) with energy of 1250 W/h*m$^2$.

3. Comparative Example (Prior Art)

The glass composite pane corresponded to that in Example 1 and 2 without sealing of the SPD film (3b). The glass composite pane was subjected as in Example 1 and 2 to heated storage for 28 days at 90° C. and a WOM test (WeatherOmeter test) for 1000 hours at 90° C. and irradiation by xenon lamp (PV3929) with energy of 1250 W/h*m$^2$.

The results of the tests of the examples are presented in Table 1. In the examples, the degeneration of the SPD film in the edge region was measured after the test runs "heated storage" and "WOM test". The degeneration of the SPD film is evidenced by brightening of the SPD film in the de-energized state. Table 1 indicates in mm the size of the edge region of the SPD film that appears bright in the de-energized state. This region is thus no longer (fully) functional.

TABLE 1

Degradation of the SPD film in the outer edge region

|  | Heated storage | WOM Test |
|---|---|---|
| Example 1 | <0.5 mm | <1 mm |
| Example 2 | <1 mm | <2 mm |
| Comparative Example 3 | >5 mm | >5 mm |

Example 1 and Example 2 according to the invention present, both with heated storage and also with the WOM Test, only very minimal and negligible damage to the edge of the SPD film. Thus, the declines in the functioning edge region move, depending on the test conditions, between 0.5 mm and 2 mm. In the Comparative Example 3, the damage to the edge (>5 mm) of the SPD film is higher by a factor of 2.5 to 10 than in the Example according to the invention. These results were surprising and not obvious to the person skilled in the art. Insulation of the SPD film with commercially available TESAFILM® [cellophane tape] yields values similar to Comparative Example 3.

LIST OF REFERENCE CHARACTERS (1) first pane
(2) second pane
(3) intermediate layer
(3*a*) first thermoplastic polymer film
(3*b*) electrically switchable transmittance-variable SPD film
(3*c*) a second thermoplastic polymer film
(3*d*) third thermoplastic polymer film
(4) edge sealing
(5) outer edge region
(6) IR-radiation-reflective coating
(7) notch
(L) length of the edge sealing along the SPD film
(I) surface above the SPD film
(II) surface below the SPD film

The invention claimed is:

1. A switchable composite pane arrangement, comprising:
a first pane;
a second pane;
an intermediate layer arranged therebetween, wherein the intermediate layer contains at least one first thermoplastic polymer film and one second thermoplastic polymer film as well as one suspended particle device (SPD) film arranged therebetween; and
an edge sealing comprising an at least 1-mm-deep notch formed in a surface region of the intermediate layer away from the first pane and the second pane that is filled with polyisobutylene (PIB) and/or polyurethane (PU),
wherein the notch reaches the SPD film and extends laterally to the outer edges of the first and the second thermoplastic polymer films, and
wherein the notch is formed after laminating the first pane, the second pane, and the intermediate layer.

2. The switchable composite pane arrangement according to claim 1, wherein the first and second thermoplastic polymer films contain PVB (polyvinyl butyral) and/or EVA (polyethyl vinyl acetate).

3. The switchable composite pane arrangement according to claim 1, wherein the first and second thermoplastic polymer films contain polyethyl vinyl acetate.

4. The switchable composite pane arrangement according to claim 1, wherein the SPD film has a thickness from 100 μm to 500 μm.

5. The switchable composite pane arrangement according to claim 1, wherein the SPD film has a thickness from 150 μm to 400 μm.

6. The switchable composite pane arrangement according to claim 1, wherein the SPD film comprises an electrical contact.

7. A method for producing a switchable composite pane arrangement, comprising:
arranging a suspended particle device (SPD) film between a first thermoplastic polymer film and a second thermoplastic polymer film to form an intermediate layer,
laminating the intermediate layer between a first pane and a second pane,
after laminating the first pane, the second pane, and the intermediate layer, milling or scratching a notch at least 1 mm deep in a surface region of the intermediate layer away from the first pane and the second pane, wherein the notch reaches the SPD film and extends laterally to the outer edges of the first and the second thermoplastic polymer films, and
filling the notch with polyisobutylene (PIB) and then polyurethane (PU) to provide an edge sealing arranged in the edge region of the intermediate layer.

* * * * *